Patented July 6, 1926.

1,591,245

UNITED STATES PATENT OFFICE.

FRITS E. STOCKELBACH, OF DOUGLASTON, QUEENS BOROUGH, NEW YORK, ASSIGNOR TO THE MATHIESON ALKALI WORKS, OF NEW YORK, N. Y., A CORPORATION OF VIRGINIA.

PROCESS OF MANUFACTURING BENZOIC ACID FROM BENZOTRICHLORIDE.

No Drawing. Application filed May 26, 1921, Serial No. 472,862. Renewed February 20, 1925.

This invention relates to a new and useful improvement in the process of manufacturing benzoic acid and has particular reference to a process of manufacturing said acid from benzotrichloride.

An object of my invention resides in the provision of a process by which in a simple and efficient manner benzoic acid is produced and the resultant product is substantially free from impurities hitherto present in the product made by the usual commercial processes.

Fundamentally, the invention comprises the suitable treatment of benzotrichloride with a carbonate of any of the alkaline earth metal elements in the presence of water.

By benzotrichloride, I mean not only the chemically pure compound having the formula $C_6H_5CCl_3$, but also the commercial product obtained by chlorination of toluol in the side chain, which commercial benzotrichloride usually contains small amounts of benzyl chloride and benzal chloride in varying proportions, besides some chlorine substitutes of benzyl and benzal chloride in which the chlorine has replaced hydrogen in the nucelus.

By carbonates of alkaline earth-metals, I mean such salts as calcium carbonate, carbonate of barium and other salts formed from the so-called alkaline earth-metal elements and carbonic acid.

It is because of the above-mentioned impurities containing chlorine in the nucelus, that benzoic acid made by the usual commercial methods frequently contains a heavy excess of chlor benzoic acid, which can only be removed with great difficulty.

One of the best known methods of producing benzoic acid commercially is to treat benzotrichloride with slaked lime in aqueous solution, either under pressure in autoclaves, or at normal atmospheric pressure, but it has been found that benzoic acid made by this process from commercial benzotrichloride always contains an excess of chlor benzoic acid.

I have now found that if I use a carbonate of an alkaline earth-metal, such as calcium carbonate, the reaction takes place in a surprisingly easy manner and the resulting benzoic acid contains only a minute trace of chlorine in combination with organic compounds.

It has usually been the case that when benzotrichloride has been boiled with relatively strong alkali, such as lime, that it has generally required a long time to effect the reaction in order to convert it into benzoic acid. However, when benzotrichloride is treated with calcium carbonate in aqueous suspension the reaction seems to proceed smoothly and completely at 80 to 90° C., and the resultant benzoic acid is of much greater purity and the yield thereof is also materially better.

It seems probable that when commercial benzotrichloride containing the various impurities above mentioned is treated with lime, some chlor benzaldehyde is formed from the chlor benzal chloride present in the commercial benzotrichloride, and this chlor benzaldehyde is decomposed by the action of lime in boiling solution into chlor benzyl alcohol and chlor benzoic acid. (Canizzaros reaction.)

In commercial benzotrichloride, chlor benzotrichloride does not seem to be present, and as the carbonates of the alkaline earth-metals are not sufficiently alkaline to cause a decomposition of the formed chlor benzaldehyde, the resulting benzoic acid is practically free from chlorinated compounds.

As an example of my invention, I may, for instance, add 700 pounds of calcium carbonate to 300 gallons of water, contained in a steam jacketed, 800 gallon still provided with reflux condenser and agitator.

The mixture is then heated to 80 to 90° C., and to this heated mixture is added, under continuous stirring, in small proportions, about 760 pounds of commercial benzotrichloride. The amount of calcium carbonate employed is somewhat in excess of that required for combining with the chlorine of the benzotrichloride. The addition of benzotrichloride to the heated mixture of calcium carbonate and water requires from three to four hours, and when this addition has been completed the heating and stirring is continued for another hour, after which the benzaldehyde and other volatile impurities formed from the impurities contained in commercial benzotrichloride are distilled off by means of live steam.

The resulting solution of calcium benzoate is now filtered and sufficient inorganic acid added to decompose the calcium benzoate, from which the benzoic acid precipitates.

From the cold solution, the precipitated benzoic acid is filtered and purified in the usual way by crystallization or sublimation.

While I have described my process in detail by reason of a preferred application thereof, it is understood that variations may be made within the scope of the claims hereinafter set forth without departing from the spirit of the invention.

What I claim is:—

1. The process of making benzoic acid which comprises treating benzotrichloride in the presence of water with a carbonate of an alkaline earth metal.

2. The process of making benzoic acid from commercial benzotrichloride resulting from the chlorination of toluol which comprises subjecting such commercial product to the action of an alkaline substance which is not sufficiently alkaline to cause a decomposition of chlor-benzaldehyde in the presence of water.

3. The process of making benzoic acid which comprises treating benzotrichloride in the presence of water with an alkali earth metal carbonate at a temperature of about 80 to 90° C.

4. The process of making benzoic acid which comprises treating benzotrichloride with calcium carbonate in the presence of water.

5. The process of making benzoic acid which comprises treating benzotrichloride with calcium carbonate in the presence of water at a temperature of about 80 to 90° C.

6. The method of manufacturing benzoic acid from commercial benzotrichloride resulting from the chlorination of toluol which comprises subjecting such product to the action of water and a carbonate of an alkali earth metal, the amount of such carbonate being somewhat in excess of that required for combining with the chlorine of the benzotrichloride.

7. The method of manufacturing benzoic acid from commercial benzotrichloride resulting from the chlorination of toluol which comprises subjecting such product to the action of water and calcium carbonate, the amount of such carbonate being somewhat in excess of that required for combining with the chlorine of the benzotrichloride.

8. The process of making benzoic acid, which comprises adding benzotrichloride slowly and in small quantities to a suspension of an alkaline earth-metal carbonate.

9. The process of making benzoic acid, which comprises adding benzotrichloride slowly and in small portions to a hot suspension of a carbonate of an alkaline earth-metal element.

10. The process of making benzoic acid, which comprises adding benzotrichloride slowly and in small portions to an aqueous suspension of carbonate of an alkaline earth-metal element heated to approximately 90° C.

11. The process of making benzoic acid, which comprises adding benzotrichloride slowly and in small portions to an aqueous suspension of carbonate of an alkaline earth-metal element heated to approximately 90° C., and then distilling off the volatile impurities.

12. The process of making benzoic acid, which comprises adding benzotrichloride slowly and in small portions to an aqueous suspension of carbonate of an alkaline earth-metal element heated to approximately 90° C., then distilling off the volatile impurities, and then precipitating the benzoic acid from the alkaline earth-metal benzoate formed in the reaction by means of an inorganic acid.

13. The process of making benzoic acid, which comprises adding benzotrichloride containing benzyl and benzal derivatives slowly and in small portions to a hot aqueous suspension of such a character that such derivatives and the impurities formed as a result of their reaction are volatile and may be distilled off.

14. The process of making benzoic acid which comprises adding benzotrichloride containing benzyl and benzal derivatives slowly and in small portions to a hot aqueous suspension of such an alkaline compound as will react with such derivatives and form volatile compounds which may be distilled off.

15. The process of making benzoic acid, which comprises adding benzotrichloride slowly and in small portions to a hot aqueous suspension of calcium carbonate at substantially 90° C., then distilling off the volatile impurities, and then adding an inorganic acid whereby benzoic acid is precipitated from the calcium benzoate formed in the previous reaction.

FRITS E. STOCKELBACH.